Jan. 19, 1960     M. L. BANK     2,921,619
PORTABLE ELECTRIC DRIVEN CONDUIT BENDER
Filed Feb. 10, 1958     5 Sheets-Sheet 1
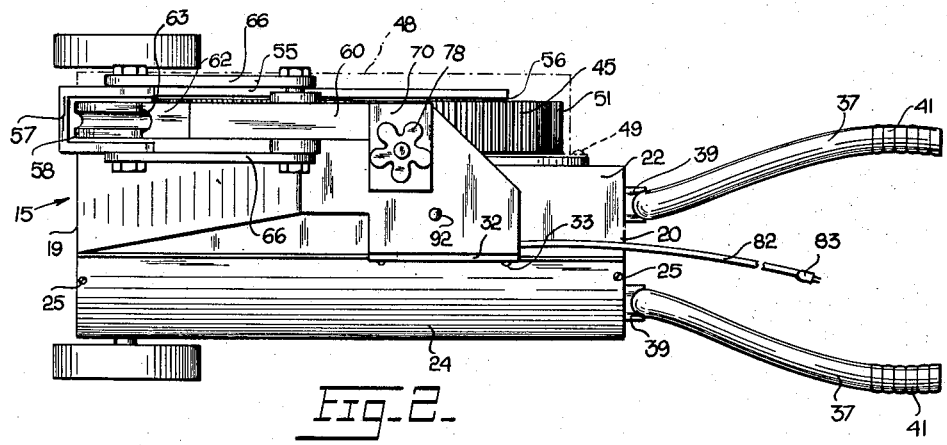
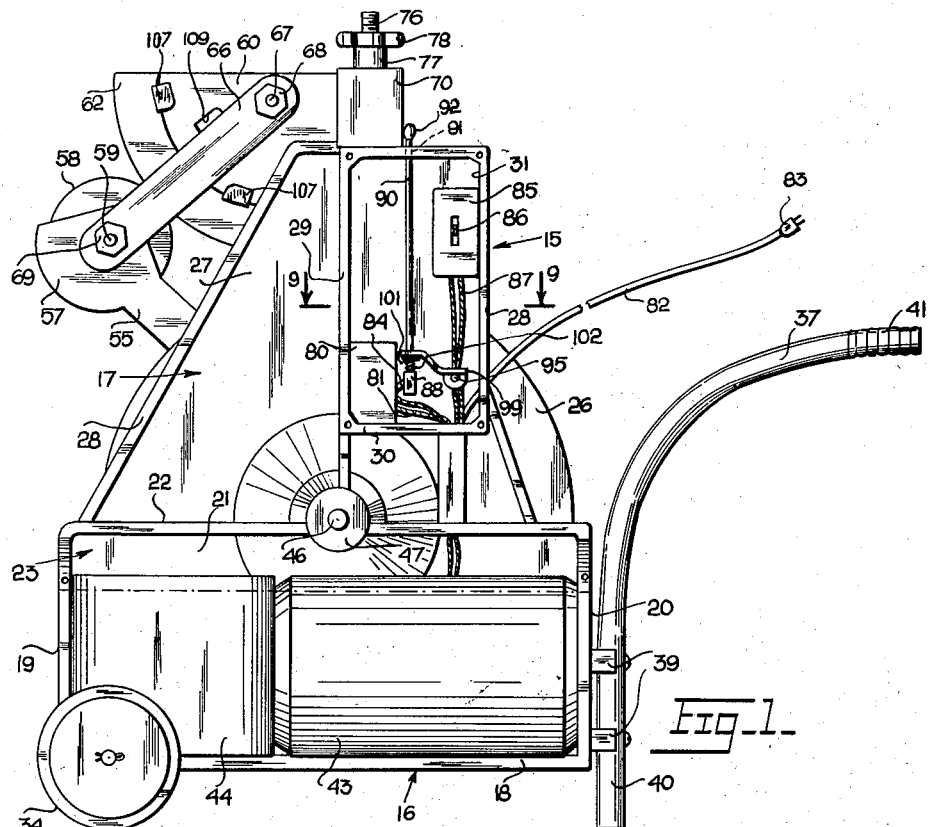
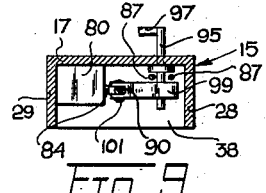
INVENTOR.
MORTON L. BANK
BY
ATTORNEY Jan. 19, 1960

M. L. BANK 2,921,619

PORTABLE ELECTRIC DRIVEN CONDUIT BENDER

Filed Feb. 10, 1958

INVENTOR.
MORTON L. BANK
BY
ATTORNEY

Jan. 19, 1960 M. L. BANK 2,921,619
PORTABLE ELECTRIC DRIVEN CONDUIT BENDER
Filed Feb. 10, 1958 5 Sheets-Sheet 3
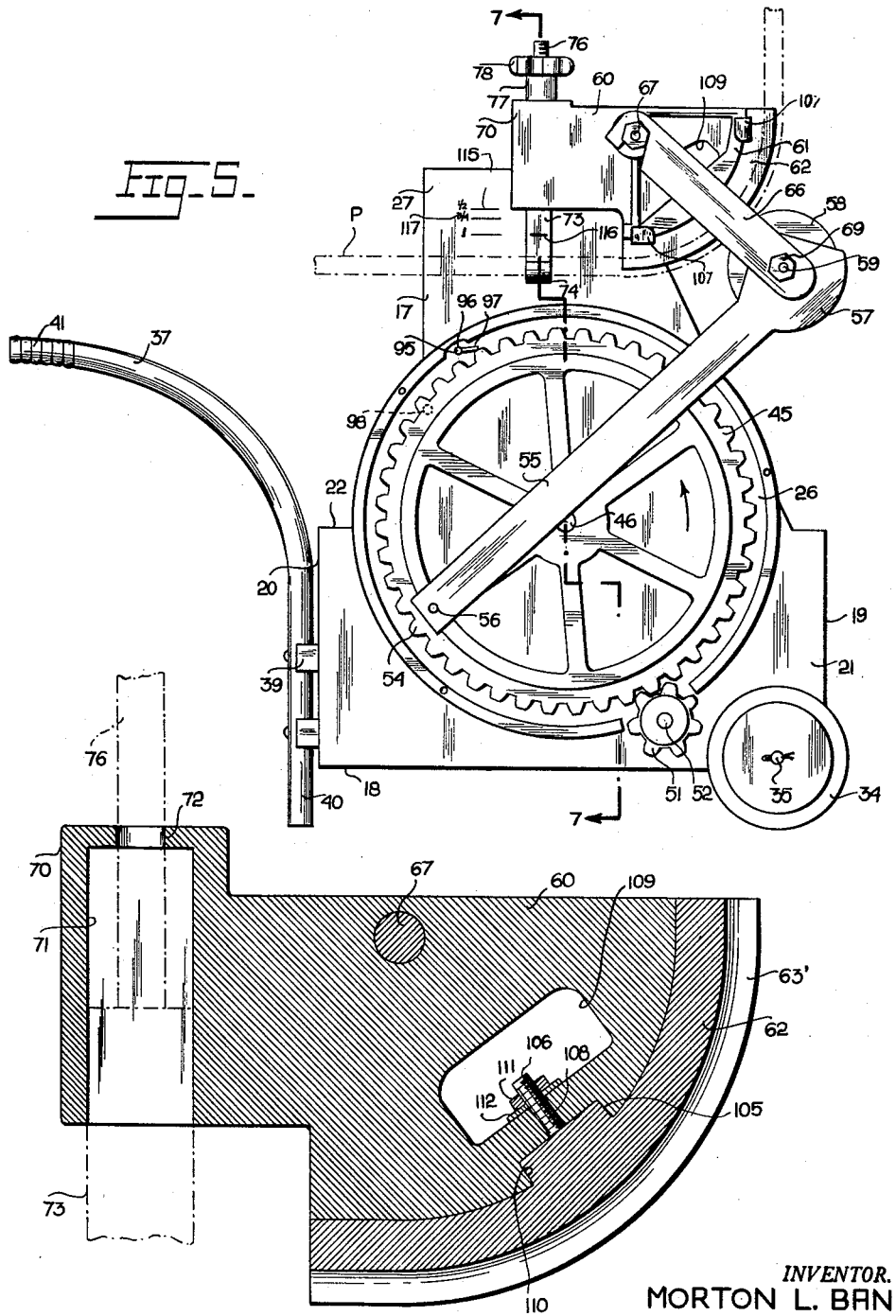
INVENTOR.
MORTON L. BANK
BY
ATTORNEY Jan. 19, 1960        M. L. BANK        2,921,619
PORTABLE ELECTRIC DRIVEN CONDUIT BENDER
Filed Feb. 10, 1958        5 Sheets-Sheet 4
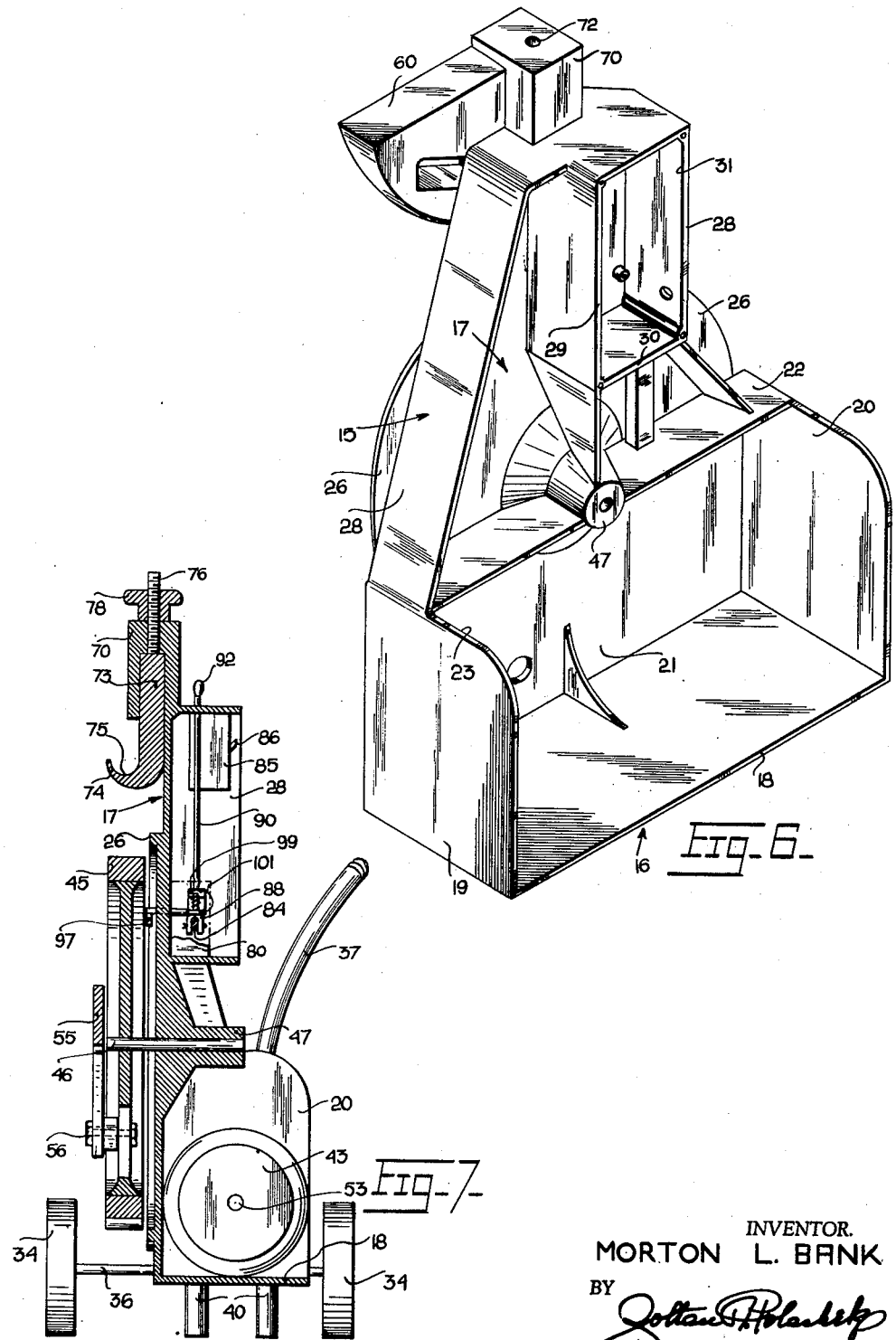
INVENTOR.
MORTON L. BANK
BY
ATTORNEY Jan. 19, 1960 M. L. BANK 2,921,619
PORTABLE ELECTRIC DRIVEN CONDUIT BENDER
Filed Feb. 10, 1958 5 Sheets-Sheet 5

INVENTOR.
MORTON L. BANK
BY
ATTORNEY

United States Patent Office 2,921,619
Patented Jan. 19, 1960

2,921,619
PORTABLE ELECTRIC DRIVEN CONDUIT BENDER

Morton L. Bank, New York, N.Y.

Application February 10, 1958, Serial No. 714,103

3 Claims. (Cl. 153—45)

This invention relates to the art of bending pipes and conduits, more particularly to a portable electrically operated machine for bending metal pipes, rods and the like, and this invention is an improvement over that disclosed in my copending application filed on May 13, 1957, Serial No. 658,589, and now Patent No. 2,863,490.

Broadly, the invention consists of a cast wheeled frame having an adjustable support for a pipe to be so positioned that the supported pipe extends between a fixed integrally formed pipe shaping anvil and a movable pipe shaping roller coacting with the anvil. The roller is carried around bodily in an arcuate path by a lever actuated by a motor driven gear. Automatic means is provided for opening the circuit through a reversible motor whereby the bending operation is stopped. Manually controlled mechanism is also provided for reversing the direction of movement of the pressing device so as to stop the bending operation.

It is an important object of the present invention to provide a pipe bending machine with a frame formed of a single casting having an integral grooved shaping anvil coacting with a grooved supporting and pressing device.

Another object of the invention is to provide a pipe bending machine having a cast frame with an integral housing for the motor and associated parts.

A further object of the invention is to provide a pipe bending machine having a cast frame with an integral housing for the electric switching mechanism.

It is also an object of the invention to provide a pipe bending machine with automatic means for controlling the length of the stroke of the pipe pressing device.

Still another object is to provide a pipe bending machine with manual means for controlling the length of the stroke of the pipe pressing device.

It is also an important object of the invention to provide a pipe bending machine with a cast frame having an integral anvil with a removable working surface.

A still further object of the invention is to provide a pipe bending machine with a readily adjustable hook support for the pipe.

It is further proposed to provide a machine of this kind that is highly efficient in operation, simple and rugged in construction, easy to inspect and repair and characterized by fewness of parts.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a pipe bending machine embodying my invention, the cover plates being omitted to show interior mechanisms.

Fig. 2 is a top plan view thereof, a cover plate being shown in dot-dash lines.

Fig. 5 is an elevational view of the other side of the pipe bending machine, parts being omitted.

Fig. 6 is a perspective view of the one-piece frame of the machine.

Fig. 7 is a vertical sectional view taken on the plane of the line 7—7 of Fig. 5.

Fig. 9 is a cross-sectional view taken on the plane of the line 9—9 of Fig. 1.

Fig. 10 is an enlarged sectional view through the longitudinal center of the anvil plate and shoe member.

Figure 3:
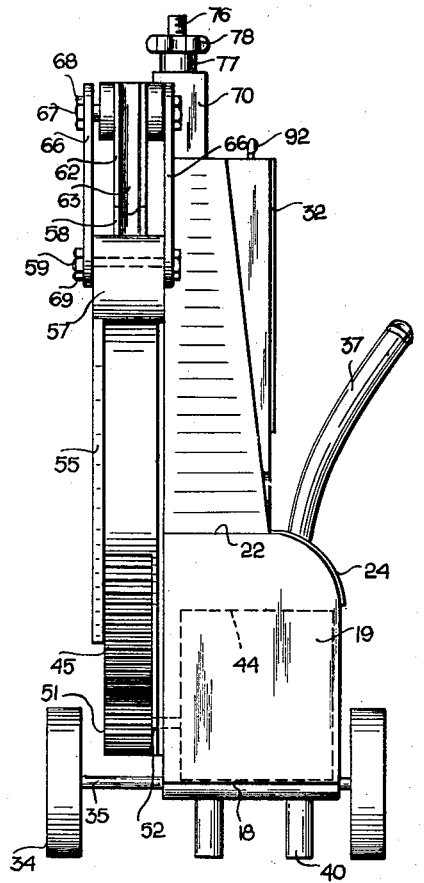
Fig. 3 is a front elevational view of the parts shown in Fig. 1.
Figure 4:
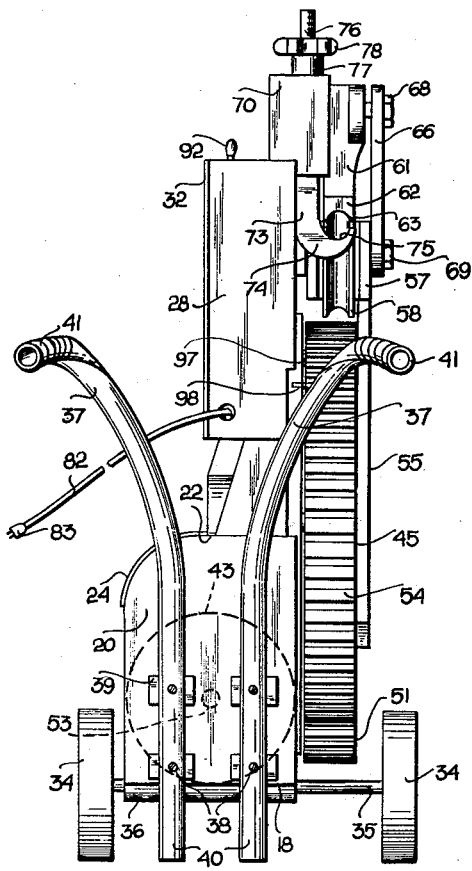
Fig. 4 is a rear elevational view of the parts shown in Fig. 1.
Figure 11:
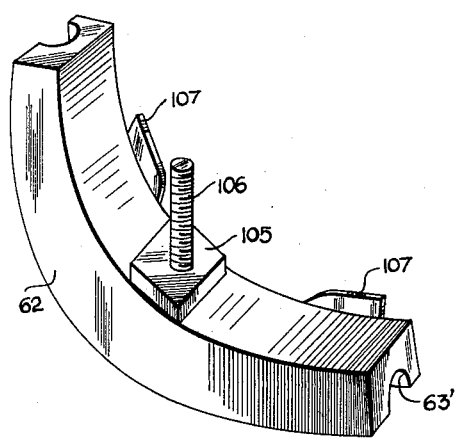
Fig. 11 is a perspective view of the detachable shoe member shown in Fig. 10.
Figure 8:
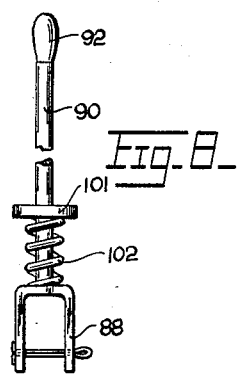
Fig. 8 is a detail view of the manual switch actuating rod.

Referring in detail to the drawings, a machine embodying my invention includes a frame indicated generally at 15. The frame is cast from malleable iron or other suitable metal and consists of a box-like base 16 and a plate-like upright extension 17 on the base. Base 16 has a bottom wall 18, front and rear walls 19 and 20, respectively, a side wall 21 and a top wall 22. The base walls define a compartment 23, open at one side. A removable closure plate 24 closes the top of the open side of the compartment and is fastened in position by screws 25. The side wall 21 has a cut away portion at the top forming a curved upper edge for the side wall.

The frame extension 17 comprises a circular plate portion 26, at its juncture with the top of the base, the bottom of the plate portion closing the cut away portion of the front wall 21 and being flush therewith. The top of the circular plate portion 26 terminates in a substantially upright rectangular shaped plate portion 27 of narrower dimensions than the circular plate portion. A continuous flange 28 extends laterally along the top, front and rear edges of the extension, the flange portion along the front edge terminating at the adjacent front end edge of the top wall 22 of the base, and the flange portion along the rear edge terminating close to the rear end of said top wall. A flange 29 extends laterally in the same direction as the flange 28 midway the ends of the extension and also from the top of the flange 28 to the top wall 22 of the base. A shelf 30 extends across the space between the flange 29 and the flange 28 along the rear edge of the extension and this shelf with the flanges define a compartment 31 open at one side. A removable plate 32 closes the open side of the compartment and is fastened in position by screws 33.

The frame 15 is supported at the front on disc-shaped wheels 34 mounted on an axle 35 rotatably supported in a tubular bearing portion 36 cast on the bottom surface of the bottom wall 18 of the base 16. At its rear, a pair of handle bars 37 extend upwardly and rearwardly from the rear wall 20 of the base 16 and are secured to the rear wall by screws 38 passing through the handle bars into cradle-shaped lugs 39 formed on the rear wall. The handle bars extend downwardly below the bottom wall 18 of the base and provide feet 40 for supporting the rear of the frame 15. Rubber caps 41 are sleeved over the top free ends of the handle bars to protect the hands of the user.

The machine is adapted to be operated by a motor 43 of the reversible type which is supported on the bottom wall 18 of the base in the compartment 23 in the base. A gear box 44 containing reduction gearing is supported alongside the motor 43. The motor and gear box are bolted or otherwise suitably fastened to the bottom wall 18.

A large gear wheel 45 is fixed on the outer end of a shaft 46 journalled in a tubular bearing 47 extending horizontally across the top wall 22 of the base, the wheel being disposed alongside of and parallel to the circular plate portion 26 of the extension 17. The periphery of the gear wheel is protected by a dish-shaped housing 48 placed over the wheel and detachably fastened to the circular plate portion by screws 49 extending through the flanged edge of the housing and through screw-threaded openings in a laterally extending flange formed around the edge of the circular plate portion 26. The housing 48 is cut away along its top edge.

The gear wheel 45 is driven by a gear pinion 51 mounted on the end of a shaft 52 extending laterally from the gear box 44, which shaft is operatively connected to the drive shaft 53 of the motor 43, through the reduction gearing. The pinion is in continuous mesh with the teeth 54 of the gear wheel 45.

A straight lever 55 extends across the side of the gear wheel 45, at its side remote from the circular plate portion 26, and has one end pivotally fastened on a pivot pin 56 carried on the periphery of the gear wheel just inwardly of its teeth 54. The other end of lever 55 is formed with an enlarged laterally offset yoke 57, U-shaped in cross section, formed integrally therewith and extending over and closely spaced from the teeth of the gear wheel. A roller 58 is disposed in the yoke between its side walls and is rotatably supported on a stub shaft 59 supported between the walls of the yoke and is formed with a groove semicircular in cross section.

An anvil 60 in the form of a segment of a circular plate is cast at the upper front top corner of the extension 17 and extends slightly above and forwardly of the extension. The arcuate-shaped peripheral edge of the anvil plate 60 is enlarged as indicated at 61 and detachably fastened along said enlarged periphery is a shoe member 62 formed with a groove 63, of similar arcuate shape, in its outer periphery, semicircular in cross section, and opening outwardly. The shoe member 62 is fastened to the anvil by means of screw 106 and wing nut 111. The groove 63 in the shoe member opens outwardly and downwardly and is disposed in alignment with the groove in the roller 58.

Interposed between the yoke member 57 and the top of the anvil plate 60 is a supporting lever 66, on each side of the anvil plate, having one end pivotally fastened to a pin 67 on the anvil and held thereon by a nut 68. The other end of each lever 66 is pivotally connected to the protruding end of stub shaft 59 and is held thereon by a nut 69.

The rear end of the anvil plate 60 continues into a vertically disposed hollow bearing block 70 formed on the extension 17 extending above and below the top wall 22 thereof. The block has a square-shaped opening 71 therein and is formed with a round opening 72 in the upper wall thereof. A pipe supporting member is adjustably and vertically supported by the bearing block. This pipe supporting member comprises an elongated plate 73 square-shaped in cross section at its upper end and having a curved bottom end 74 providing a semi-circular seat 75. An externally screw-threaded shank portion 76 extends from the upper end of the upper end. The pipe supporting member is supported in the bearing block 70 with its threaded shank portion 76 extending loosely through the central opening 72 and with its squared upper end positioned in the opening 71. The curved lower end 74 projects below the bearing block with the curved seat below the lowermost portion of the groove 63 in the shoe member 62 and being disposed in the same plane as the planes of the shoe member and roller 58. A nut member having an elongated cylindrical body portion 77 and a handle 78 is mounted on the protruding end of the shank portion 76 with its body portion adapted to seat upon the top of the bearing block. Upon rotation of the nut member, the pipe supporting member 73 is moved up or down in order to adjust the seat thereof relative to the grooves in the shoe member 62 and roller 58.

The electric switching mechanism for controlling the operation of the motor 43 is mounted in compartment 31 on the extension 17 of the frame. The switching mechanism includes an electric switch 80 supported on the shelf 30 of the compartment and connected to a source of electromotive force by conductors 81 connected to a conductor 82 having a plug 83. Switch 80 is provided with a protruding insulated actuating member 84. Another switch 85 is supported on the side flange 28 of the compartment and is similarly provided with a protruding insulated actuating member 86 and is connected to the source of electromotive force by conductors 87 and conductor 82 and plug 83. A U-shaped yoke member 88 surrounds the actuating member 84 and is pivotally fastened thereto by a pin 89. An upright rod 90 is secured at its bottom end to the bight portion of the yoke 88 and at its upper end extends through an opening 91 in the top portion of the flange 28 and is provided with a handle 92 on its protruding end. Upon pulling upwardly on the rod 90, the circuit through the motor is closed and the gear wheel 45 is driven around.

Mechanism is also provided for automatically breaking the circuit through the motor 43 to stop the turning of the gear wheel 45. This mechanism includes a stub shaft 95 pivotally mounted in an opening 96 in the circular plate portion 26 of the extension 17 adjacent the periphery of the gear wheel 45.

The shaft 95 extends on both sides of the circular plate portion and on the end of the shaft on the side of the plate portion close to the gear wheel there is a radially disposed metal finger 97 disposed in the path of movement of a pin 98 secured to the periphery of the gear wheel and extending laterally toward the circular plate portion 26. The other end of the shaft 95 extends into the compartment 31 and on this end there is fastened one end of a metal finger 99 and movable therewith. The other end of the finger 99 is bifurcated, the bifurcations 100 thereof straddling the rod 90 and seated on a washer 101 slidable on the rod 90. Washer 101 is seated on one end of a coil spring 102 sleeved around the rod, the other end of the spring being seated against the bight portion of the U-shaped yoke 88 for urging the finger 99 upwardly. Movement of the stub shaft 95 in one direction by engagement of the pin 98 on the gear wheel 45 with the finger 97 causes the finger 99 to press down the yoke 88 and actuating means 84 of the switch 80 thereby opening the circuit through the motor and stopping the turning of the gear wheel 45.

In operation, a straight length of pipe or bar P as shown in dash lines in Fig. 5 is placed on the pipe supporting seat 75 of the pipe supporting member 73 and is slid forwardly through the space between the roller 58 and bottom grooved end of the shoe member 62 of the anvil 60. In this position the pipe will rest loosely in the seat of the supporting member 75. The rod 90 is then pulled upwardly actuating the switch 80 and closing the circuit through the motor 43. The gear wheel 45 is driven around by the pinion 51, carrying the lever 55 with it. The lever carries the yoke 57 and roller 58 in the direction of the turning of the gear wheel 45 for a predetermined distance, for example ninety degrees, the roller riding along the pipe and pressing it ahead and bending it against the anvil shoe member 62 thereby forcing the pressed end of the pipe into an angular relationship with respect to the rest of the pipe, for example, into an angular relationship of ninety degrees. At the end of said predetermined distance, the lever 55 pulls the yoke 57 with its roller 58 in the opposite direction thus carrying the roller away from the pipe and ending the bending operation. The gear wheel 45 continues to turn until the pin 98 on gear wheel 45 engages the finger 97 on stub shaft 95 whereby said stub shaft is turned and the finger 99 pressed downwardly against washer 101 forcing the yoke 88 downwardly thereby moving the actuating member 84 to circuit opening position and stopping movement of the motor and gear wheel.

The bending operation may be stopped manually at any point when the desired curvature has been obtained. This is done by moving the switch actuating member 86 of the switch 85 in the desired direction to reverse the direction of movement of the drive shaft of the motor. This causes the lever 55 to pull the yoke 57 with roller 58 away from the pipe. In order to stop the movement of the gear wheel 45, however, the upright rod 90 must be manually pushed downwardly to break the circuit through the motor.

By adjusting the pipe supporting member 73, 90° bends can be made in pipes without changing the shoe member 62 or roller 58 and regardless of different tensile strength of various qualities of pipe. The ready change of shoe and roller also enables thin walled conduits and other types of pipes to be bent.

The shoe member 62 may be readily removed and replaced by a shoe member of different radii. The shoe member 62 is formed with an integral square-shaped enlargement 105 on its inner periphery, midway its ends, and extending radially from said enlargement is a screw 106. Along one side are inwardly and radially extending guides 107 for holding the shoe member 62 against displacement. The screw 106 extends through a radial opening 108 formed in the outer periphery of the anvil plate 60 and communicating with an opening 109 formed in the body of the anvil plate and spaced closely away from its periphery and communicating with a countersunk portion 110 formed in the outer periphery of the anvil plate. The enlargement 105 seats in the countersunk portion 110 and the shoe member is held on the periphery of the anvil plate by a nut 111 on the inner end of the screw 106. A washer 112 may be interposed between the nut and edge wall of the opening 109. A semicircular groove 63 is formed in the outer periphery of the shoe member.

The surface of the plate member 27 of the extension 17 may be provided with spaced horizontal lines or markings 115, and the plate 73 of the pipe supporting member may be similarly marked with a horizontal line 116 whereby the height of the pipe supporting member may be readily adjusted for properly supporting pipes of various sizes in alignment with the grooves in the shoe member 62 of the anvil and in the roller 58. The pipe sizes are indicated by the indicia 117 at the left of the lines 115.

Figure 12:
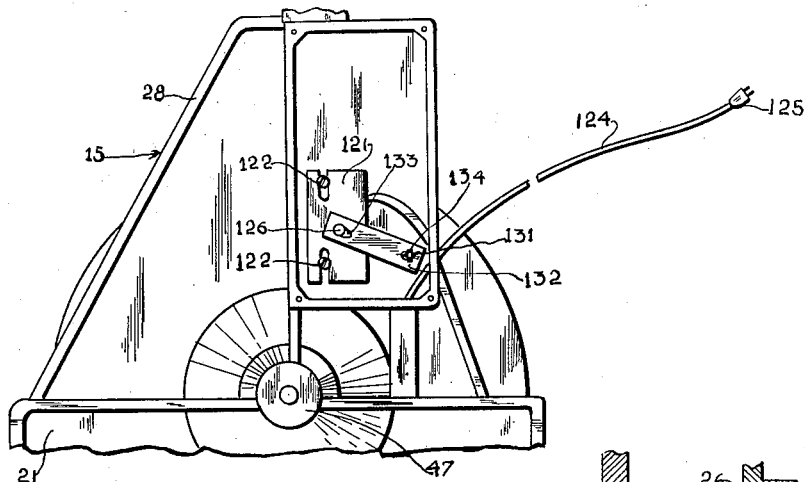
Fig. 12 is a fragmentary side elevational view similar to Fig. 1 showing modified electric switching mechanism.
Figure 14:
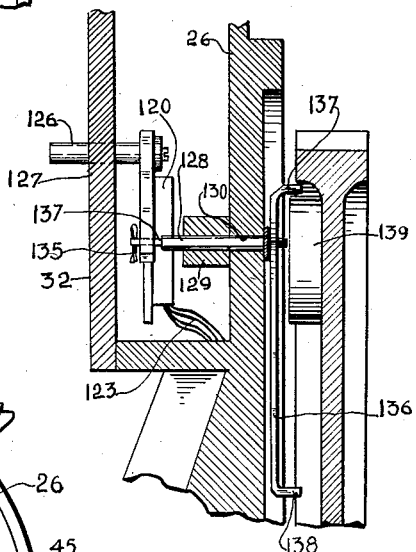
Fig. 14 is a fragmentary cross-sectional view similar to Fig. 7 showing the modified switching mechanism.
Figure 13:
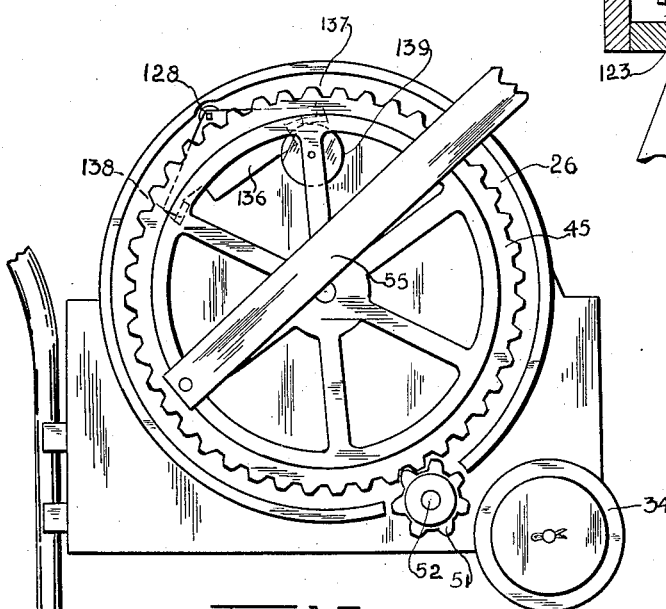
Fig. 13 is a fragmentary side elevational view similar to Fig. 5 showing the automatic switch opening mechanism.

The motor 43 may also be controlled by the modified switching mechanism shown in Figs. 12–14. This modified switching mechanism includes an electric switch 120 in the compartment 31 supported on a plate 121 removably supported on spaced projecting posts 122 on the rear wall of the compartment. The switch is connected to a source of electromotive force by conductors 123 connected to a conductor 124 having a plug 125. Switch 120 is provided with an insulated actuating member 126, which projects through an elongated slot 127 in the cover plate 32 of the compartment to the outside thereof. By manually moving the actuating member 126 downwardly, the circuit through the motor is closed and the gear wheel 45 is driven around.

Mechanism is associated with the switch 120 for automatically breaking the circuit through the motor 43 to stop the turning of the gear wheel 45. This mechanism includes a shaft 128 journalled in a cylindrical bearing member 129 in the compartment alongside the switch. Shaft 128 extends through an opening 130 in the upper end of the circular plate portion 26 to the rear thereof adjacent the periphery of the gear wheel 45. The front end 131 of the shaft terminates in opposed flat sides. A bar 132 connects the actuating member 126 and the flat end 131 of the shaft, the bar having a hole 133 larger than the cross-sectional diameter of the actuating member 126 at one end thereof to receive the actuating member loosely, and having an elongated slot 134 at the other end to receive the flat end 131 of the shaft whereby turning movement of the flat end of the shaft is imparted to the switch actuating member 126. A cotter pin 135 holds the bar on the shaft.

On the end of shaft 128 close to the gear wheel 45 there is a substantially triangular shaped plate 136 secured to the shaft at its apex end and formed at the other ends with outwardly turned flanges 137 and 138 disposed below and closely spaced from the periphery of the gear wheel 45. Flange 137 is disposed in the path of movement of a camming disc 139 fixed to one of the spokes of the gear wheel 45 adjacent the periphery thereof. Movement of the actuating member 126 downwardly to circuit closing position turns the plate 136 so that flange 137 is disposed in the path of movement of the disc 139. When flange 137 is thus positioned, rotation of the gear wheel carrying disc 139 therearound will cause the disc to engage the flange 137 and tilt the plate 136 on its shaft thereby turning the shaft 128 and moving bar 132 whereby the actuating member 126 is automatically moved upwardly to circuit closing position. Flange 138 during the tilting of the plate 136 by disc 139 engages the periphery of the gear wheel and limits movement thereof in the circuit opening direction.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A pipe bending machine comprising a one-piece frame having a box-like base portion and an upright plate-like extension, an arcuate-shaped anvil plate integral with the extension, an arcuate-shaped shoe member removably mounted on the periphery of the anvil plate, said shoe member having a semicircular groove along its outer periphery, a gear wheel rotatably supported on the frame in alignment with the shoe member, means for rotating said gear wheel, a pipe supporting member adjustably mounted on the anvil plate, a lever disposed alongside of said gear wheel and having one end pivotally connected to the gear wheel adjacent its periphery, a U-shaped yoke member on the other end of the lever, said yoke member being offset from the plane of the lever and being disposed over the periphery of said gear wheel, a shaft extending between the walls of said yoke member, a grooved roller supported on said shaft between said walls, in alignment with the groove in the shoe member, and a supporting lever interposed between said other end of the first-named lever and the anvil plate and being pivotally connected to said lever and anvil plate, said shoe member having guide members on one side thereof.

2. A pipe bending machine comprising a one-piece frame having a box-like base portion, and a plate-like upright extension, an electric motor in said base, an anvil plate on the upper end of said frame extension, said anvil plate having an enlarged arcuate peripheral edge, a shoe member removably mounted on said edge, said shoe member having an arcuate-shaped outer periphery with a groove therealong, a gear wheel rotatably mounted on the frame, a lever pivotally supported at one end near the periphery of the gear wheel, a U-shaped yoke member on the other end of said lever, a grooved roller in said yoke member in line with the groove in the shoe member, a lever interposed between the yoke member and anvil plate, said lever being pivotally connected to said yoke member and anvil plate, a pinion engaged with said gear wheel and being driven by said motor, switching means carried by the extension for starting, stopping and reversing the motor, and means for manually breaking the circuit through the motor, said switching means including a switch having a protruding actuator, said manual circuit breaking means including a rotatable shaft extending through the frame extension to a point adjacent the gear wheel, a substantially triangular-shaped plate on the end of the shaft adjacent the periphery of said wheel, flanges on the ends of said plate adapted to be moved into engagement with the periphery of said gear wheel upon tilting of the plate by said shaft, a disc carried by the gear wheel adjacent the periphery thereof, one of said flanges disposed in the path of movement of said disc, and a bar flexibly connecting the other end of the shaft and the switch actuator for moving said actuator to circuit breaking position.

3. A pipe bending machine comprising a one-piece frame having a box-like base portion and an upright plate-like extension, an arcuate-shaped anvil plate integral with the extension, an arcuate-shaped shoe member removably mounted on the periphery of the anvil plate, said shoe member having a semicircular groove along its outer periphery, a gear wheel rotatably supported on the frame in alignment with the shoe member, means for rotating said gear wheel, a pipe supporting member adjustably mounted on the anvil plate, a lever disposed alongside of said gear wheel and having one end pivotally connected to the gear wheel adjacent its periphery, a U-shaped yoke member on the other end of the lever, said yoke member being offset from the plane of the lever and being disposed over the periphery of said gear wheel, a shaft extending between the walls of said yoke member, a grooved roller supported on said shaft between said walls, in alignment with the groove in the shoe member, and a supporting lever interposed between said other end of the first-named lever and the anvil plate and pivotally connected to said lever and anvil plate, said pipe supporting member consisting of an integral bearing block on one end of the anvil plate, said block having an opening therethrough, an elongated plate member having one end housed in said opening, a screw-threaded shank extending from the housed end of the plate and protruding outwardly of the bearing block, the other end of said plate having a curved seat for supporting a pipe, and a nut on the protruding end of the shank adapted to coact with said bearing block for moving said plate and holding said plate in adjusted moved position, and means on the frame extension and elongated plate for indicating the desired position of the elongated plate for supporting pipes of various sizes in aligned position with the grooved shoe member and grooved roller, said indicating means including spaced lines marked on the surface of the frame extension adjacent the elongated plate and a line on the elongated plate adapted to be moved into registration with one of said surface lines on the frame extension.

References Cited in the file of this patent

UNITED STATES PATENTS

| 439,809 | Bowen | Nov. 4, 1890 |
| 992,807 | Rulf | May 23, 1911 |
| 1,136,252 | Meier | Apr. 20, 1915 |
| 1,239,165 | Davis | Sept. 4, 1917 |
| 1,419,755 | Potter | June 13, 1922 |
| 1,479,762 | Wagenbach | Jan. 1, 1924 |
| 2,025,360 | Simmons | Dec. 24, 1935 |
| 2,080,899 | Pirani | May 18, 1937 |
| 2,620,848 | De Paoli | Dec. 9, 1952 |
| 2,656,872 | Mann | Oct. 27, 1953 |

FOREIGN PATENTS

| 417,656 | Great Britain | Oct. 3, 1934 |
| 558,203 | Great Britain | Dec. 24, 1943 |